(12) United States Patent
Ridgway

(10) Patent No.: US 11,988,284 B1
(45) Date of Patent: May 21, 2024

(54) LOCOMOTIVE DIESEL ENGINE POWER ASSEMBLY CYLINDER HEAD-TO-CYLINDER LINER GASKET GROMMET

(71) Applicant: Master Packing and Rubber Company, Cedar Rapids, IA (US)

(72) Inventor: Robert Ridgway, Northbrook, IL (US)

( * ) Notice: Subject to any disclaimer, the term of this patent is extended or adjusted under 35 U.S.C. 154(b) by 36 days.

(21) Appl. No.: 17/541,032

(22) Filed: Dec. 2, 2021

(51) Int. Cl.
- *F16J 15/08* (2006.01)
- *F01P 3/02* (2006.01)
- *F02F 11/00* (2006.01)

(52) U.S. Cl.
CPC ............. *F16J 15/0825* (2013.01); *F01P 3/02* (2013.01); *F02F 11/002* (2013.01); *F02F 11/005* (2013.01); *F01P 2003/028* (2013.01)

(58) Field of Classification Search
CPC .... F16J 15/0825; F01P 3/02; F01P 2003/028; F02F 11/002; F02F 11/005
See application file for complete search history.

(56) References Cited

U.S. PATENT DOCUMENTS

| | | | | |
|---|---|---|---|---|
| 2,395,243 A | * | 2/1946 | Aukers | F16J 15/123 277/600 |
| 2,681,241 A | * | 6/1954 | Aukers | F16J 15/123 277/596 |
| 3,499,655 A | * | 3/1970 | Kapps | F16J 15/123 277/600 |
| 3,664,676 A | * | 5/1972 | Petersen | F16J 15/104 277/600 |

FOREIGN PATENT DOCUMENTS

WO  WO-2015159818 A1 * 10/2015 ............... B32B 1/08

\* cited by examiner

*Primary Examiner* — Hung Q Nguyen
(74) *Attorney, Agent, or Firm* — Charles T. Riggs, Jr.

(57) ABSTRACT

A method, system and device for gasketing and sealing of locomotive diesel engine power assembly's internal combustion cooling medium process. The method, system and device comprise a single metal gasket having a plurality of individual elastomeric grommets specifically constructed for sealing the internal power assembly cooling fluid movement through the muting surfaces of the two-piece assembly consisting of the cylinder liner and the cylinder head. The grommets pre-assembled into the gasket at a plurality of internal fluid passage locations are selectively configured to withstand the critical assembly clamping pressure condition and the extreme temperature fluctuations experienced during the combustion process itself. The grommet material composition includes a percentage of carbon black, and eliminates any elastomeric yellow coloration additive.

20 Claims, 7 Drawing Sheets

LOCOMOTIVE DIESEL ENGINE POWER ASSEMBLY CYLINDER HEAD-TO-CYLINDER LINER GASKET GROMMET

TECHNICAL FIELD

The exemplary teachings herein pertain to a method, system and device for gasketing and sealing of each of a locomotive diesel engine's individual power assembly's internal combustion cooling medium process. Specifically, the present disclosure relates to a singular metal gasket having a plurality of individual elastomeric grommets specifically constructed for sealing the internal power assembly cooling fluid movement through the mating surfaces of the two-piece assembly of the cylinder liner and the cylinder head.

BACKGROUND

Typically, most diesel/electrical locomotives have a power generation source assembled into the locomotive to generate the electrical power required to drive the traction motors found on each of the multiple wheel sets. This power source has in the past been comprised of only two diesel engine configurations based on the combustion cycle, the two stroke Electro-Motive Division of General Motors, (EMD), and the four stroke General Electric Transportation System, (GETS). This unique and significant difference in the combustion cycle specifically defines the required internal fluid cooling system and thus the coolant sealant requirements for each of these two diesel engines individual and multiple power assemblies.

The EMD locomotive diesel engine's multiple but separate and individual power assemblies, typically being 8, 12, 16 or 20 per this two-stroke diesel engine's V-block arrangement, have three external components of each power assembly: the cylinder head, the cylinder liner, and the typical metal sealing gasket assembly torqued and mounted and thus clamped between the mating surfaces of the cylinder head and the cylinder liner with the fundamental purpose of preventing leakage, in both directions. This assembly, i.e., the cylinder head, the cylinder liner and the metal sealing gasket, constitutes the external components of each individual power assembly that would then additionally include the final assembly internal components, namely the piston, rings, piston wrist pin and connecting rod, which comprise the moving or working components of the combustion cycle.

The two-stroke power assembly cylinder liner and the cylinder head are distinctly constructed with a designated plurality of vertical fluid passages to allow engine cooling fluid to freely flow transversely through the cylinder liner and then tangentially or circumferentially through the cylinder head internal passages in order to cool, control, maintain, and/or prevent the cylinder working combustion temperatures from becoming excessive on the surfaces exposed to the severe temperatures, leading to potential heat distress, thermal fatigue failure and potential seizing of the piston rings that are contacting the internal liner surface. The metal sealing component assembled between the mating surfaces of the cylinder liner and the cylinder head is commonly referenced to as a cylinder head-to-liner gasket or just head gasket. The two stroke engine head-to-liner gasket is pre-assembled physically with elastomeric grommets with the specific purpose to seal/prevent/obstruct any/all fluid intrusion from the aforementioned internal cylinder liner and head water passages into the cylinder combustion cavity, and in addition, to prevent the extrusion of combustion by-products, designated as "blow-by exhaust gas vapors," into the internal liner fluid passages and the cylinder head exhaust passageways, leading to a common occurrence referenced as exhaust souping.

The head-to-liner gasket is directionally and specifically configured to require only one assembly method and installed onto the cylinder liner before the installation of the cylinder head using the cylinder liner's multiple assembly studs as the mechanical location guide for the correct and proper gasket installation. A condition exists during the actual combustion event in that grommets located in the several head-to-liner gasket locations, those closest to the center of the V-engine block, are exposed to higher operating exhaust temperatures than the remaining grommets due strictly to the resultant exhaust stream gas flow from the combustion chamber through the cylinder head into the exhaust chamber/passageway leading to and entering the exhaust manifold. Specifically, the two sealing grommets located in the upper assembly location (that being the closest to the center of the V-engine block) are exposed to higher operating temperatures than the other assembly grommets due to their location in direct relationship with the combustion exhaust flow out of the cylinder and into the exhaust chamber leading to the exhaust manifold. These higher exhaust temperatures have a direct effect on the power assembly's durability and service performance on the locomotive diesel engine.

The head-to-liner gasket grommets have been pre-assembled into the head-to-liner gasket and have evolved over the last few years in an attempt to remedy many past design and performance imperfections, including both dimensional changes as well as material or chemical composition.

One past attempt at a solution to suitably provide a sealing gasket for a locomotive power assembly is disclosed in U.S. Pat. No. 3,156,224 entitled Head Gasket for Diesel Engine, issued to Winkler on Nov. 10, 1964, herein incorporated by reference. Disclosed therein is a combination of two gaskets, the first metal skeletal gasket for shielding against exhaust gases generated in the combustion chamber and the second elastomeric material gasket incorporating "integral loops" for water sealing respectively around each water passage.

In one embodiment disclosed therein, "the most effective elastomeric water seal gasket may be used and these are fully protected by gasketing which is properly resistant to the heat pressure and corrosive effect of combustion and exhaust gases. A much more effective and long-lasting water seal, accordingly, is provided."

Another past attempt at a solution to suitably provide a sealing gasket for a locomotive power assembly is disclosed in U.S. Pat. No. 3,664,676 entitled Cylinder Head Gasket Assembly, issued to Petersen et al. on May 23, 1972, herein incorporated by reference. Disclosed therein is a combination of a "thin annular sheet metal member having raised copper portions" and a "plurality of coolant openings, each receiving a snap-in grommet. The grommets preferably comprise a soft elastomeric inner seal portion bonded or otherwise retained to a plastic resin base outer insulating portion."

In one embodiment disclosed therein, "composite seal rings are provided which include an inner elastomeric sealing portion molded or otherwise retained to a plastic resin base outer insulating portion. The elastomeric inner portion is preferably made of a silicone rubber compound while the outer insulating portion is preferably formed of a glass-filled polytetrafluoroethylene (PTFE) material."

A more recent attempt at a solution to suitably provide a sealing gasket for a locomotive diesel engine power assembly is disclosed in U.S. Patent Publication No. 2006/0086327 A1 entitled Engine Power Assembly, published to Flynn et al. on Apr. 27, 2006, herein incorporated by reference. Disclosed therein is a device for a locomotive four-stroke diesel engine manufactured by General Electric Co., specifically: "A locomotive diesel engine, having a cylinder liner and a separate water jacket surrounding the cylinder liner, with a portion of the water jacket being positioned between the cylinder liner and the engine frame, where the cylinder liner is supported by the water jacket. An external shoulder on the cylinder liner can be supported by an internal flange in the water jacket, thereby eliminating direct contact between the cylinder liner and the engine frame. A coolant passage can be provided between the water jacket and the cylinder liner, at a point adjacent the topmost position of the top piston ring. An upper liner seal can be provided between the cylinder liner and the water jacket, above the coolant passage, and a lower liner seal can be provided between the cylinder liner and the engine frame, below the coolant passage. Coolant ports can be provided for coolant flow directly between the cylinder head and the water jacket, with seals in the coolant ports to seal the coolant, independently of the head gasket."

Additionally, a head gasket for an individual power assembly entity easily removed and replaced as designed and found on all large bore medium speed locomotive diesel engines, is disclosed in U.S. Pat. No. 5,700,017 entitled Flanged Rubber Combustion Seal, issued to Tensor on Dec. 23, 1997, herein incorporated by reference. That disclosure relates to a cylinder head gasket having a combustion seal formed from two interconnected sections of high temperature resistant elastomeric material, an annular elastomeric combustion seal and an annular elastomeric fluid flow seal, wherein the radially inner section is optionally enclosed in a generally U-shaped metal flange. Neither seal's elastomeric material is specified but a further disclosure states that these seals have superior high temperature and pressure sealing performance due to their natural recovery characteristics and hydraulic response to the opposing exhaust and fluid flow pressures. As an additional benefit, it was stated that the elastomeric material's reaction to the assembly clamping load is a desirable compression resistant factor.

As discussed above, such prior art devices and methods suffer from numerous disadvantages, drawbacks and/or limitations. Further, these devices and methods tend to be inefficient and outdated in both mechanical design and chemical composition of the diesel engine cylinder head gasket requirements. Therefore, a need exists for a head gasket which overcomes these and other disadvantages and shortcomings of prior art head gaskets, to prevent fluid intrusion from the internal cylinder liner and head water passages into the cylinder combustion cavity, and to prevent exhaust souping. The exemplary teachings disclosed herein fulfill such a need, and provide other advantages over prior art gaskets.

SUMMARY

The exemplary method(s), system(s) and device(s) disclosed herein comprise a unique combination of dimensional configuration(s) and material composition(s) that will greatly improve the diesel engine power assembly head-to-liner mounting gasket's sealing integrity and extend the locomotive's service life until the next consequential engine overhaul occurs, wherein the power assembly head-to-liner gaskets are removed and renewed with a new gasket. The head gasket of the present disclosure is intended to achieve a one million mile service life.

The head-to-liner gasket of the present disclosure comprises mechanical, dimensional and chemical composition features that contribute to the overall improved durability performance of the head-to-liner gasket thus promoting longer operational life and greater reliability from leakage failures. These mechanical, dimensional and material chemical composition features include a) a grommet dimensional profile configuration and shape for preventing the compression forced material to flow into the cylinder liner's water passage restricting water flow and reduce the mechanical sealing clamp load, and for providing additional clamping pressure on the grommet's profile to increase the sealing effect. (compression resistance), b) the material composition includes a calculated and significant percentage of carbon black that combined with the most compatible derivative of the current Viton® elastomer (registered trademark of The Chemours Company FC, LLC of Wilmington DE) chemistry properties will also enhance the resistance to compression set, especially to hold and maintain the new configuration dimensions and profile and to provide additional resistance to beat stress and degradation for the observed higher operating exhaust temperatures, and c) the removal or reduction of the current grommet elastomeric material coloration additive (material/chemistry) that in combination with the modified Viton® chemistry composition will also promote an increase in the compression and heat stress resistance required for long term durability.

The locomotive diesel engine power assembly cylinder head-to-cylinder liner gasket grommet of the present disclosure increases the sealing integrity of this severe gasketing application and provides a significant improvement in extending the operational service life of the locomotive diesel engine.

Accordingly, it is an objective hereof to provide a method, system and device for a grommet dimensional profile configured and shaped to prevent the compression forced material to flow into the cylinder liner's water passage restricting water flow and reduce the mechanical sealing clamp load, and to provide additional clamping pressure on the grommet's profile to increase the sealing effect, (compression set resistance).

It is another objective hereof to provide a method, system and device in which the material composition includes a calculated and significant percentage of carbon black that combined with the most compatible derivative of the current Viton® elastomer chemistry properties will also enhance the resistance to compression set, (especially to hold and maintain the new configuration dimensions and profile) and to provide the additional resistance to heat stress and degradation for the observed higher operating exhaust temperatures without the need of PTFE or metal sleeves.

It is still another objective hereof to provide a method, system and device for which the removal or reduction of the current grommet elastomeric material coloration additive, (material/chemistry) being in combination with the modified Viton® chemistry composition will also promote an increase in the compression and heat stress resistance required for long term durability.

It is a further objective hereof to provide a cost-effective method, system and device to install and secure the locomotive diesel engine power assembly cylinder head-to-cylinder liner gasket in the correct assembly location addressing the past design grommet imperfections for the plurality of grommets exposed to the highest temperatures and pressures that are accountable for past engine and locomotive mission failures.

Additional objectives, advantages and features will be set forth in part in the description which follows, and in part will become apparent to those skilled in the art upon examination of the following and the accompanying drawings or may be learned by production or operation of the examples.

BRIEF DESCRIPTION OF THE DRAWINGS

The drawing figures depict one or more implementations in accord with the present teachings, by way of example only, not by way of limitation. In the drawing figures, like reference numerals refer to the same or similar elements.

DETAILED DESCRIPTION

The following description refers to numerous specific details which are set forth by way of examples to provide a thorough understanding of the relevant method(s), system(s) and device(s) disclosed herein. It should be apparent to those skilled in the art that the present disclosure may be practiced without such details. In other instances, well known methods, procedures, components and/or hardware have been described at a relatively high-level, without detail, in order to avoid unnecessarily obscuring aspects of the present disclosure. While the description refers by way of example to head-to-liner gaskets and the installation and use thereof, it should be understood that the method(s), system(s) and device(s) described herein may be used in any situation where similar gaskets are needed or desired.

Figure 1:
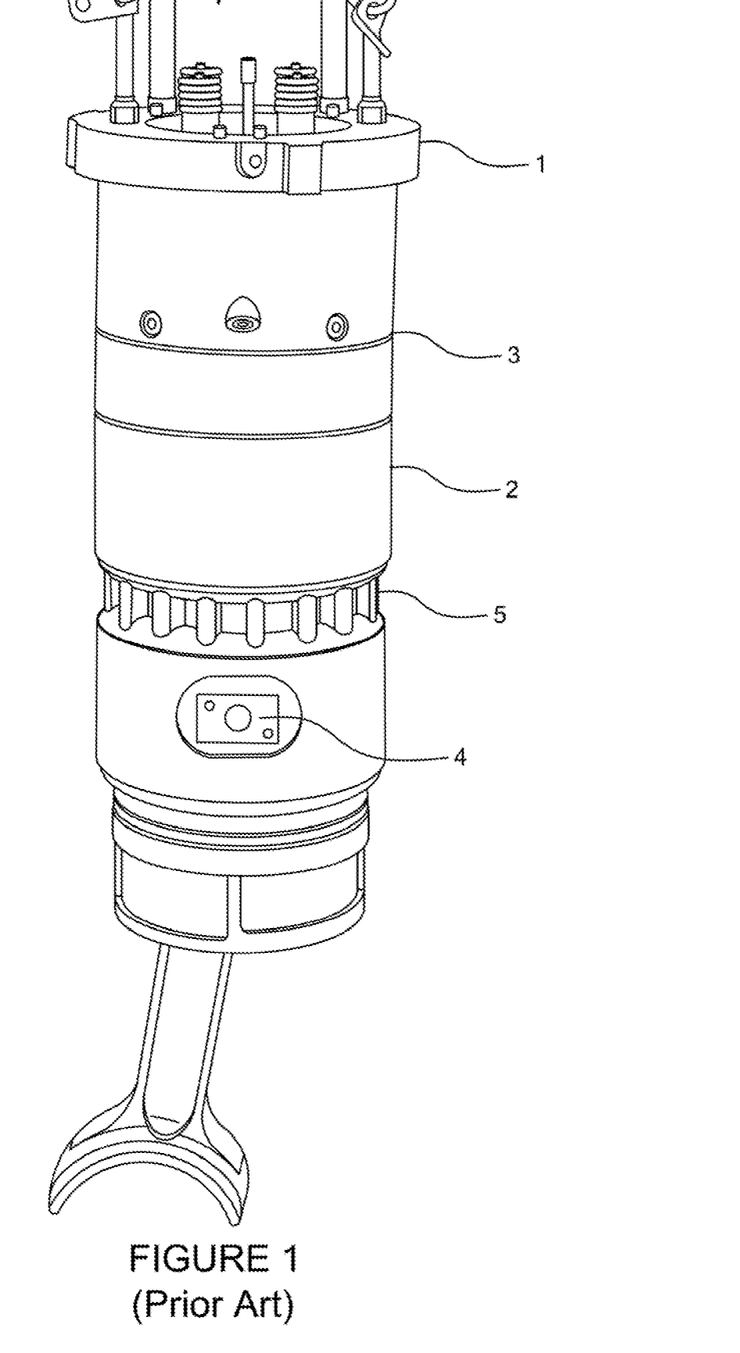
FIG. 1 is a perspective view of a prior art locomotive power assembly head-to-liner assembly illustrating the locations of the three main components of the assembly: the cylinder head, the cylinder liner and the head-to-liner gasket.

FIG. 1 illustrates a complete typical locomotive diesel engine two-stroke power assembly with the three major components designated as follows: the cylinder head 1, the cylinder liner 2 and the cylinder head-to-liner gasket 3 therebetween. The power assembly is cooled with pressurized cooling fluid(s) entering through the water inlet passage 4, transversing through the vertical water passages 5 and then passing through the cylinder head-to-liner gasket 3 and finally through the cylinder head 1 and exiting out a water discharge port.

Figure 2:
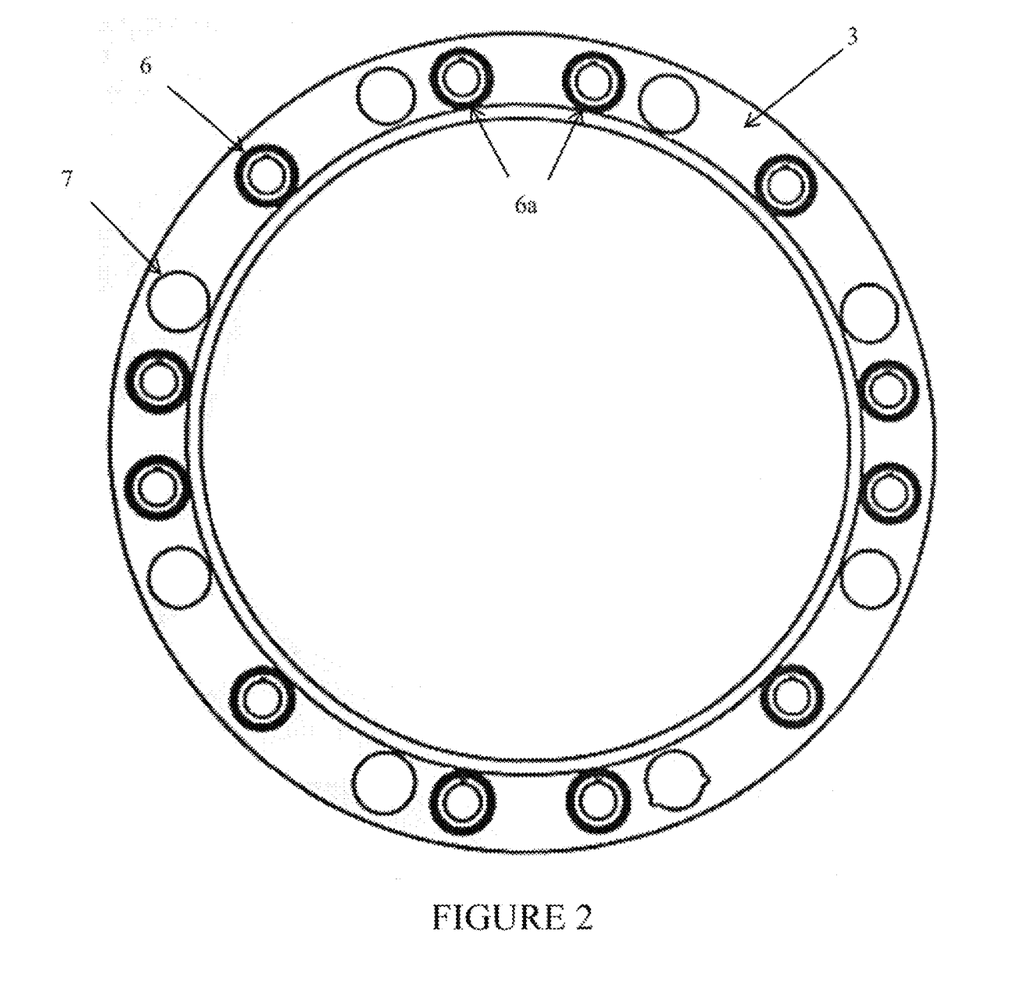
FIG. 2 is a top view of the head-to-liner gasket and grommet assembly illustrating the location of upper two critical grommets installed in the gasket.

FIG. 2 illustrates the assembly head-to-liner gasket 3 in the correct orientation for the proper assembling onto the cylinder liner. As can be seen from FIG. 2, the plurality of grommets 6, twelve in total, are assembled in the gasket holes. Two of these grommets, referenced as 6a, are herein referred to as "critical" grommets 6a, and are placed in the correct location on the gasket 3 in relevance to the combustion exhaust port. Eight bolt holes 7 are also illustrated.

Figure 3:
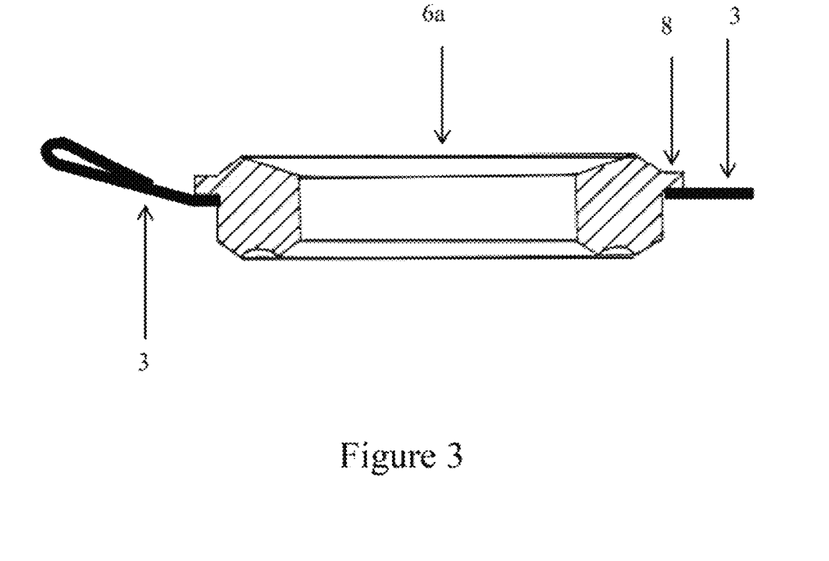
FIG. 3 is a cross sectional view of the gasket and grommet illustrating the assembly relationship.

FIG. 3 illustrates a cross section view of the gasket 3 and critical grommet 6a assembly depicting the relationship between the mating surfaces of each component, in an uncompressed state. As can be seen, the grommet 6a generally has a modified hexagonal cross-sectional shape when uncompressed, and has an upper annular flange 8 which rest upon the gasket 3 at the perimeter surface surrounding the gasket hole in which it sits.

FIGS. 4-6 and 8 illustrate the critical grommet 6a and the plurality of configuration diameters that have been incorporated, in an uncompressed state. The outside flange 8 diameter defines the assembly function of establishing and maintaining the proper surface contact interface between the gasket and the cylinder head and holding the grommet in place during assembly. The flange 8 extends outward from the outer diameter 9a of the grommet. Inner gasket diameter 9b maintains the required water flow area through the gasket permitting maximum flow and cooling. The outer diameter 10 and inner diameter 11 of the radiused cavity 14 provide two sealing contact points as well as control the material crush, clamp load and torque retention at assembly.

Figure 5:
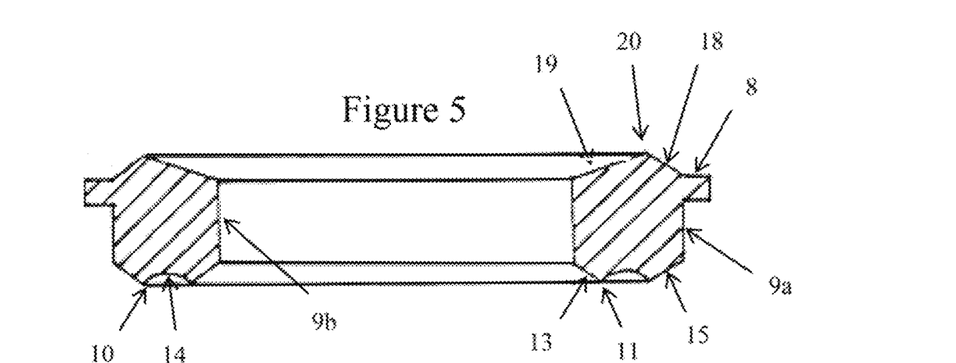
FIG. 5 is a full diameter cross-sectional view of the grommet highlighting the plurality of surfaces and diameters.
Figure 6:
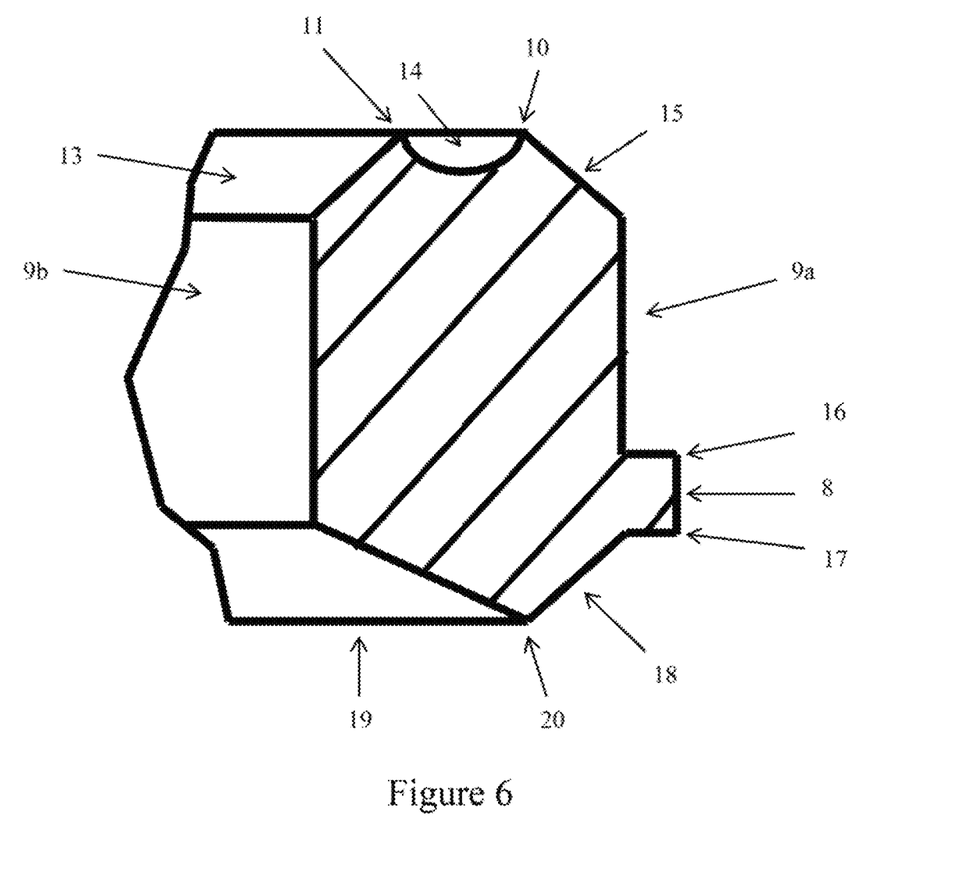
FIG. 6 is a partial cross-sectional view of the gasket grommet highlighting the plurality of surfaces and diameters.

FIG. 5 (full) and FIG. 6 (partial, enlarged) illustrate the cross-section of grommet 6a and the plurality of configuration diameters that have been incorporated, in an uncompressed state. The outside flange 8 diameter defines the assembly function of establishing and maintaining the proper surface contact interface between the gasket and the cylinder head and holding the grommet in place during assembly. Inner diameter 9b maintains the required water flow area through the gasket permitting maximum flow and cooling. The outside diameter 9a maintains the necessary contact pressure with the inside diameter of the gasket grommet hole.

The diameters 10, 11 of the radiused cavity 14 provide two sealing contact points as well as control the sealing contact pressure, material crush, clamp load and torque retention at assembly. The outside diameter 9a maintains the necessary contact pressure with the inside diameter of the gasket grommet hole. The chamfered surfaces 13, 15 offer a relief to allow the gasket material expansion under clamp loading between the gasket and the cylinder liner. The radiused cavity 14 offers additional relief to allow the gasket material expansion under clamp loading between the gasket and the cylinder liner. The outer flange 8 maintains two distinct diameter surfaces 16, 17 that promote material flow under clamp loading to increase the sealing surface area between the gasket and the cylinder head. The chamfered surfaces 18, 19 which meet at apex 20 offer a relief to allow the gasket material expansion under clamp loading between the gasket and the cylinder head. Apex 20 also provides a sealing contact point.

Figure 7:
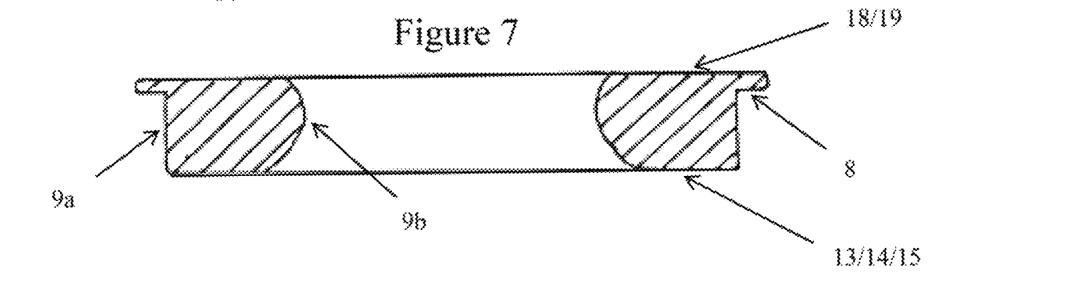
FIG. 7 is a full diameter cross-sectional view of the grommet of FIG. 5 under compression.

FIG. 7 illustrates the shape of the gasket under clamp loading between the mating surfaces of the cylinder head and the cylinder liner. As can be seen, when under compression, the chamfered surfaces 18, 19 flatten out and become a single linear surface, such that apex 20 is no longer present under compression. Similarly, when under compression, chamfered surfaces 13, 15 and radiused cavity 14 flatten out and become a single linear surface, such that the diameters 10, 11 are no longer present under compression. During this compression, gasket material flows inward such that inner diameter 9b bulges and becomes curved, yet maintains the required water flow area through the gasket permitting maximum flow and cooling. The full cross-sectional shape of the inner diameter 9b under compression resembles that of a hyperboloid shaped cylinder, as can be seen in FIG. 7. Also, outer flange 8 flattens and extends outward over the surface of the gasket when under compression.

Figure 8:
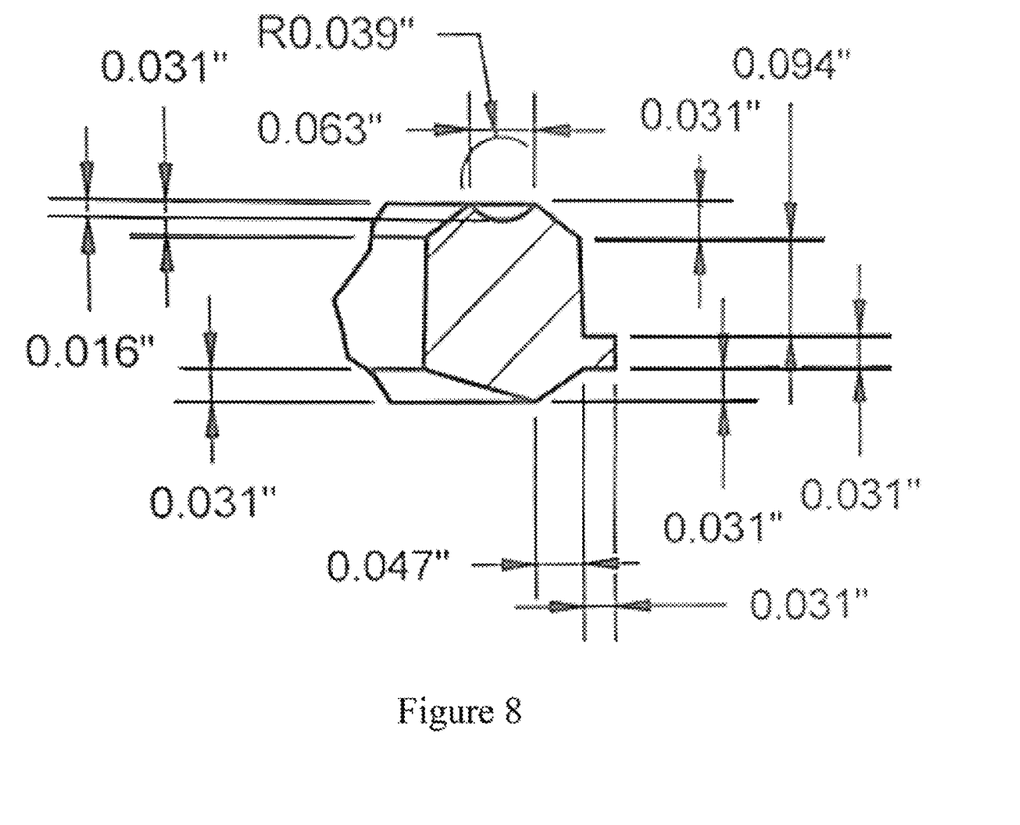
FIG. 8 is a dimensional view of the partial cross-sectional view of the gasket grommet of FIG. 6.

FIG. 8 illustrates the preferred dimensions of the cross section of the gasket grommet 6a in its uncompressed state. Further, the diameter of the inside diameter is preferably 0.500 inches when not under compression, and is preferably 0.470 inches when under compression at its narrowest point, as shown in FIG. 7.

The gasket 6a material composition and durometer can be of elastomeric composition with the appropriate durometer required for these materials and the fluid sealing application. For example, the gasket 6a may be made of Viton® F-type family of fluoroelastomers, such as the Viton™ F-605C fluoroelastomer, with a 75 to 80 durometer, preferably 80 durometer, along with the addition of a percentage of carbon black, for example 5% to 15% carbon black, and preferably 10% carbon black by weight of the material mix. The carbon black is an extremely fine, dust like powder added in to the material mix at the start and is blended in. The material composition is further characterized by the removal or reduction of elastomeric yellow coloration additive powder from the material mix. Preferably, the elastomeric yellow coloration additive powder is completely eliminated.

Figure 4:
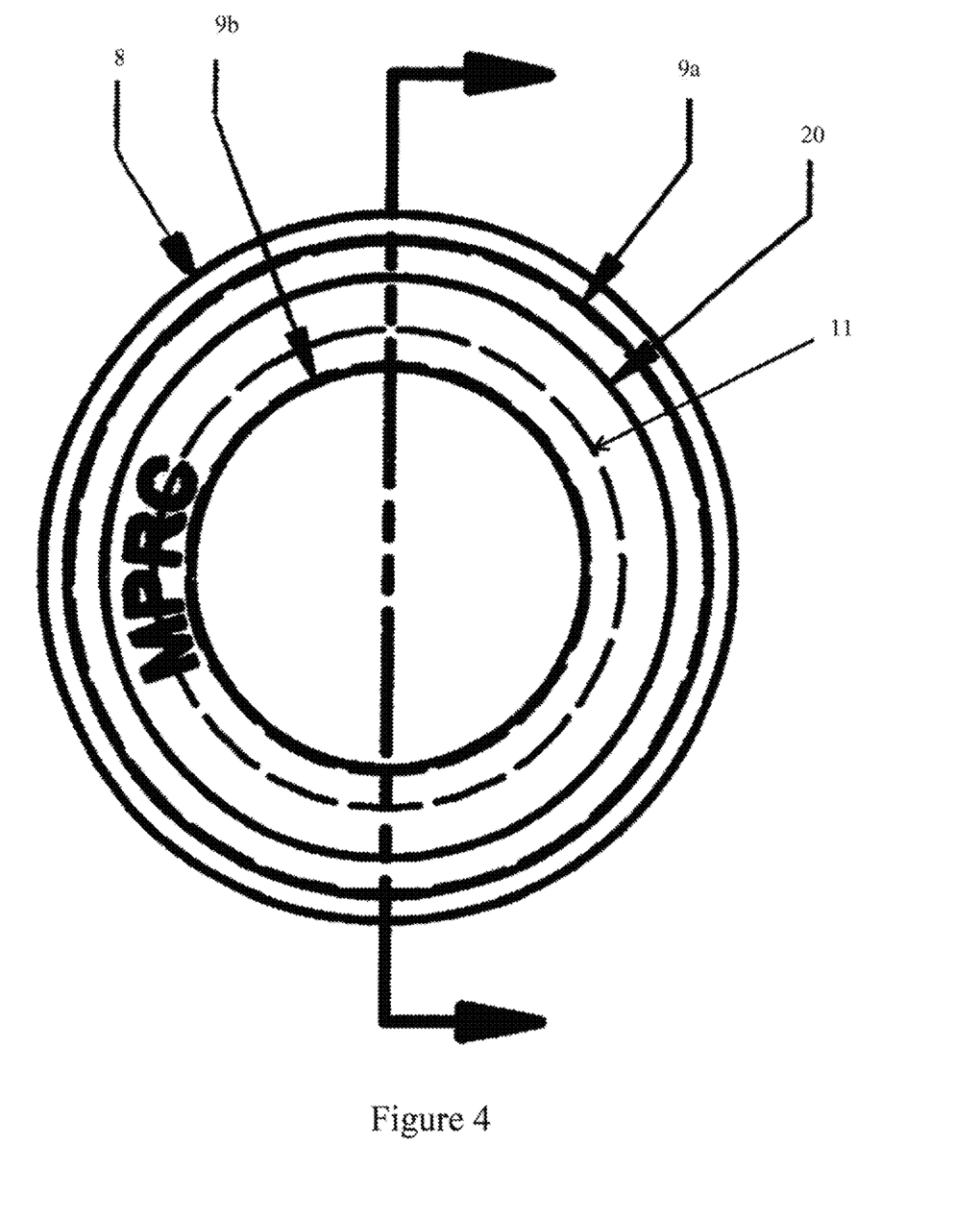
FIG. 4 is a top view of a preferred embodiment of the grommet illustrating various preferred diameters.

These gasket examples, together with the critical gasket 6a configuration shown in FIGS. 4-6, meet the demands of a high performance seal, suitable for a critical grommet in a head gasket application.

While the embodiment(s) disclosed herein are illustrative of the structure, function and operation of the exemplary method(s), system(s) and device(s), it should be understood that various modifications may be made thereto with departing from the teachings herein. Further, the components of the method(s), system(s) and device(s) disclosed herein can take any suitable form, including any suitable material or other components capable of adequately performing their respective intended functions, as may be known in the art.

While the foregoing discussion presents the teachings in an exemplary fashion with respect to the disclosed method(s), system(s) and device(s) for providing a sealing gasket between a cylinder head and a cylinder liner in a locomotive diesel engine power assembly, it will be apparent to those skilled in the art that the present disclosure may apply to other method(s), system(s) and device(s) utilizing the disclosed gasket technologies. Further, while the foregoing has described what are considered to be the best mode and/or other examples, it is understood that various modifications may be made therein and that the subject matter disclosed herein may be implemented in various forms and examples, and that the method(s), system(s) and device(s) may be applied in numerous applications, only some of which have been described herein.

What is claimed is:

1. A head gasket grommet comprising:
a hexagonal cross-sectional configuration having a radiused cavity therein; and
an outer diameter flange.

2. The grommet of claim 1, further comprising a fluoroelastomer material.

3. The grommet of claim 2, further comprising a percentage of carbon black added to the fluoroelastomer material.

4. The grommet of claim 3, wherein the percentage of carbon black added to the fluoroelastomer material is 10%.

5. The grommet of claim 3, further comprising the absence of elastomeric yellow coloration additive in the fluoroelastomer material.

6. The grommet of claim 2, wherein the fluoroelastomer material has a durometer of 75-80.

7. The grommet of claim 1, wherein the hexagonal cross-sectional configuration has an annular shaped inside diameter when not under compression, and has a hyperboloid shaped inside diameter when under compression.

8. A locomotive diesel engine power assembly gasket device for mounting between a cylinder head and a cylinder liner, comprising:
a structural metal ring having a plurality of assembly holes orientated for assembly over power assembly mounting studs;
a plurality of clearance holes in the structural metal ring for internal passage of cooling fluid; and
a circumferential sealing grommet inserted into each of the plurality of clearance holes;
wherein at least one of the circumferential sealing grommet incorporates a dimensional profile configuration and shape for preventing compression forced material to flow into the internal passage and restricting the flow of cooling fluid while under compression, wherein the dimensional profile configuration and shape comprises a hexagonal cross-sectional configuration having a radiused cavity therein, and an outer diameter flange.

9. The device of claim 8, wherein the dimensional profile configuration and shape of the circumferential sealing grommet is configured to provide clamping pressure points on contact surfaces of the grommet to increase compression resistance between the cylinder head and the cylinder liner.

10. The device of claim 8, wherein the circumferential sealing grommet has a material chemical composition comprising an elastomeric material and which incorporates a percentage of carbon black additive to the elastomeric material to increase an energy retention and compression resistance property of the circumferential sealing grommet material.

11. The device of claim 10, wherein the circumferential sealing grommet material chemical composition is characterized by an absence of elastomeric coloration additive to complement the increase of the energy retention and compression resistance property of the grommet material.

12. The device of claim 10, wherein the percentage of the carbon black additive is 10% of the material composition.

13. A method of making a head gasket grommet comprising the steps of:
forming the grommet with a hexagonal cross-sectional configuration having a radiused cavity therein; and
providing an outer diameter flange on the grommet.

14. The method of claim 13, further comprising the step of forming the grommet from a fluoroelastomer material.

15. The method of claim 14, further comprising the step of adding a percentage of carbon black to the fluoroelastomer material.

16. The method of claim 15, further comprising the step of removing an elastomeric yellow coloration additive from the fluoroelastomer material.

17. The method of claim 14, wherein the fluoroelastomer material has a durometer of 75-80.

18. The method of claim 13, wherein the hexagonal cross-sectional configuration has an annular shaped inside diameter when not under compression, and has a hyperboloid shaped inside diameter when under compression.

19. The method of claim 15, wherein the step of adding a percentage of carbon black to the fluoroelastomer material comprises adding 5% to 15% carbon black.

20. The method of claim 15, wherein the step of adding a percentage of carbon black to the fluoroelastomer material comprises adding 10% carbon black.

\* \* \* \* \*